United States Patent
Kinoshita et al.

(10) Patent No.: US 11,407,377 B2
(45) Date of Patent: Aug. 9, 2022

(54) GAS GENERATOR AND AIRBAG MODULE

(71) Applicants: DAICEL CORPORATION, Osaka (JP); HONDA MOTOR CO., LTD., Tokyo (JP)

(72) Inventors: Gen Kinoshita, Tatsuno (JP); Nobuyuki Katsuda, Tatsuno (JP); Daiei Tonooka, Wako (JP)

(73) Assignees: DAICEL CORPORATION, Osaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/607,171

(22) PCT Filed: May 11, 2018

(86) PCT No.: PCT/JP2018/018245
§ 371 (c)(1),
(2) Date: Oct. 22, 2019

(87) PCT Pub. No.: WO2018/212080
PCT Pub. Date: Nov. 22, 2018

(65) Prior Publication Data
US 2020/0384943 A1  Dec. 10, 2020

(30) Foreign Application Priority Data
May 16, 2017  (JP) ............................. JP2017-096924

(51) Int. Cl.
*B60R 21/264*  (2006.01)
*B60R 21/237*  (2006.01)
(Continued)

(52) U.S. Cl.
CPC .......... *B60R 21/264* (2013.01); *B60R 21/237* (2013.01); *B60R 21/272* (2013.01);
(Continued)

(58) Field of Classification Search
CPC ............................................ B60R 2021/26076
See application file for complete search history.

(56) References Cited

U.S. PATENT DOCUMENTS

| 5,346,251 A | 9/1994 | Burnar et al. |
| 2019/0383589 A1 * | 12/2019 | Boutin .................. B60R 21/264 |

FOREIGN PATENT DOCUMENTS

| JP | 8-505340 A | 6/1996 | |
| JP | 2011225069 A * | 11/2011 | ........... B60R 21/264 |

(Continued)

OTHER PUBLICATIONS

International Preliminary Report on Patentability and English translation of the Written Opinion of the International Searching Authority for International Application No. PCT/JP2018/018245, dated Nov. 28, 2019.

(Continued)

*Primary Examiner* — Nicole T Verley
(74) *Attorney, Agent, or Firm* — Birch, Stewart, Kolasch & Birch, LLP

(57) ABSTRACT

A gas generator including an outer vessel including a housing provided with a gas discharge port, the outer vessel accommodating therein an igniter and a gas generating agent, wherein any of surfaces of the outer vessel includes an annular fragile portion, and the annular fragile portion is a groove formed in a continuous annular shape or a groove formed in a discontinuous annular shape.

9 Claims, 4 Drawing Sheets

(51) Int. Cl.
   *B60R 21/272*   (2006.01)
   *B60R 21/26*    (2011.01)
(52) U.S. Cl.
   CPC .............. *B60R 2021/26029* (2013.01); *B60R 2021/2642* (2013.01); *B60R 2021/26076* (2013.01)

(56) References Cited

FOREIGN PATENT DOCUMENTS

| JP | 2014-196092 A | | 10/2014 | |
|----|---------------|---|---------|---|
| JP | 2014196093 A | * | 10/2014 | |
| JP | 2015-151010 A | | 8/2015 | |
| WO | WO 95/03194 A1 | | 2/1995 | |
| WO | WO-2016194465 A1 | * | 12/2016 | ........... B60R 21/263 |
| WO | WO-2018235598 A1 | * | 12/2018 | ........... B60R 21/264 |

OTHER PUBLICATIONS

International Search Report for International Application No. PCT/JP2018/018245, dated Jul. 24, 2018.

* cited by examiner

GAS GENERATOR AND AIRBAG MODULE

TECHNICAL FIELD

The present invention relates to a gas generator used in an airbag device mounted in an automobile.

BACKGROUND ART

Pyrotechnic gas generators and hybrid-type gas generators using a gas generating agent as a gas source are used.

JP H08-505340 A describes an invention of an overpressure regulator used in an inflatable vehicle occupant restraint system including an inflatable housing having a gas producing pyrotechnic.

The overpressure regulator in JP H08-505340 A includes an arcuate groove which is strategically located in a surface of a pressure vessel (a housing). The arcuate groove ruptures upon the occurrence of a predetermined overpressure in the pressure vessel to function as a safety arrangement for venting pressure in the case of over pressurization.

In addition, the preferred embodiment in JP H08-505340 A describes that "the upper section 12 of the housing 10 is provided with an arcuate, passive, stress concentration groove 20 that ruptures upon the occurrence of a predetermined over pressure in the inflator 10. The groove 20 is arcuate to facilitate peeling of a convex portion 22 from a concave portion 24 of the housing 12". Thus, JP H08-505340 A implies that a problem is solved by providing the arcuate groove.

SUMMARY OF INVENTION

A first aspect of the present invention (hereinafter referred to as a "first aspect") is a gas generator including an outer vessel including a housing provided with a gas discharge port, the outer vessel accommodating an igniter and a gas generating agent. In the gas generator, any of surfaces of the outer vessel includes an annular fragile portion, and the annular fragile portion is a groove formed in a continuous annular shape or a groove formed in a discontinuous annular shape.

A second aspect of the present invention (hereinafter referred to as a "second aspect") is a gas generator including an outer vessel including a housing provided with a gas discharge port, the outer vessel accommodating an igniter and a gas generating agent. In the gas generator, the outer vessel includes a housing provided with an opening and a closing member configured to close the opening of the housing, a peripheral wall on a side of the opening of the housing includes a plurality of split peripheral walls that are circumferentially split, and the closing member is fixed by a plurality of bent portions formed by bending the plurality of split peripheral walls inward, and the plurality of bent portions serve as the annular fragile portion and are configured to open by being pressed and spread by the closing member to allow the closing member to be disengaged from the outer vessel, thereby forming an opening.

The present invention further provides an airbag module, including, an airbag configured to be in an inflated state from a folded state by being supplied with gas, a module case configured to accommodate the airbag, and any one of the aspects of the gas generators according to the present invention configured to supply the gas to the airbag. In the airbag module, the gas generator is disposed in the module case, with the annular fragile portion facing a direction different from a direction where the airbag is provided.

BRIEF DESCRIPTION OF DRAWINGS

The present invention will be more fully understood from the following detailed description and the accompanying drawings. However, the detailed description and the drawings are merely provided for the purpose of illustration and do not limit the present invention.

DESCRIPTION OF EMBODIMENTS

Figure 1A:
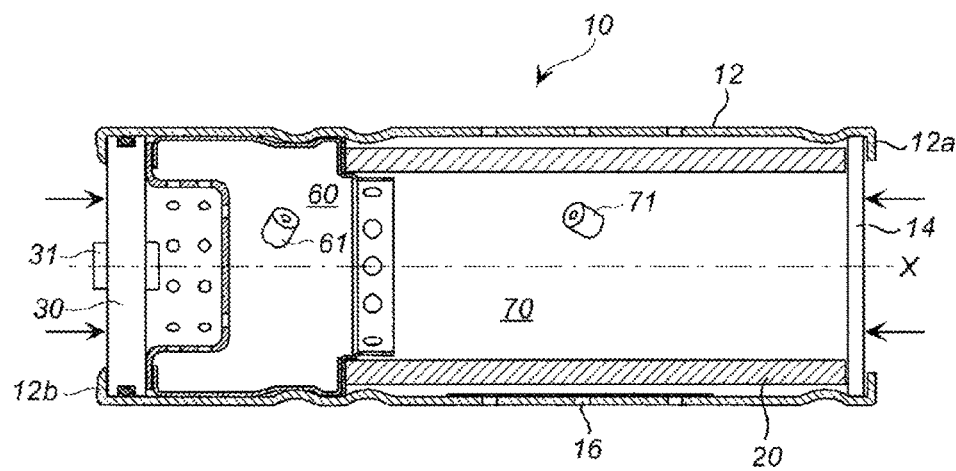
FIG. 1A is an axial cross-sectional view of a gas generator according to an embodiment of the present invention.

The present invention provides a gas generator including a safety arrangement, in which a fragile portion of an outer vessel can be annularly cleaved to form an opening in the outer vessel, thereby venting pressure from the fragile portion annularly cleaved.

The gas generator according to the first aspect is a gas generator that uses a gas generating agent as a gas source, and includes known pyrotechnic gas generators using only a gas generating agent as a gas source, as well as known hybrid-type gas generators using a gas generating agent and a pressurized gas (such as argon or helium) as gas sources.

The gas generator according to the first aspect includes an annular fragile portion on any of surfaces of the outer vessel. The configuration of the surface of the outer vessel differs depending on the type of gas generator, and is any surface selected from a planar surface, a curved surface, and a surface extending over both of a planar surface and a curved surface.

In a normal operating state, for example, an operating state in which components in the housing have no damage, degradation, etc., and in which output performance based on the design is achieved, the annular fragile portion is not cleaved. The annular fragile portion is cleaved only in a non-normal operating state (hereinafter referred to as an "abnormal operating state"). The abnormal operating state is established, for example, when, for some reason, the internal pressure in the outer vessel becomes greater than the internal pressure in the gas generator that is operating normally (including a case where the pressure from the inside of the outer vessel reaches or becomes greater than a pressure limit based on the design). In such a case, the annular fragile portion annularly cleaves to form an opening in the outer vessel, and thus, functions as a safety arrangement for venting the pressure.

In addition, with the fragile portion being annularly cleaved, a predetermined opened area can be always obtained, and thus, stable pressure venting performance is achieved. For example, when the fragile portion is a region formed by being provided with a spot hole or the like to partially reduce a portion of the wall thickness of the outer vessel plane, venting performance becomes unstable. This is because, in the abnormal operating state, not the entire planar region of the outer vessel ruptures starting from a rupture originating in the thinned part, and the rupture does not always result in creating an opening always having a predetermined same opening area.

By configuring the fragile portion to have a groove shape extending in a specific direction in the present invention, stress is easily concentrated, and this leads to a superior reproduction of an opening. The fragile portion may be formed in a position that does not face a member blocking the opening that is formed after cleavage (a position directly facing a space formed on the inside of the outer housing).

In a preferable embodiment, the annular fragile portion is formed on the outer surface of the outer vessel. However, the annular fragile portion may be formed on the inner surface of the outer vessel. Furthermore, for example, the annular fragile portion may be configured not to directly receive pressure at the time of actuation by being covered with another member.

The outer vessel is made of metal such as iron or stainless steel to withstand pressure.

Gas generators are required to have different functions depending on locations of installation thereof when installed on vehicles, and thus the shapes and sizes thereof also differ in accordance with the functions. For example, a disc-shaped outer vessel is often used when the gas generator is installed for a driver's seat, and a cylinder-shaped outer vessel is often used when the gas generator is installed for a passenger's seat or a side of a seat.

When the cylinder-shaped outer vessel is used, a ratio (L/D) of a length L to an outer diameter D thereof is, for example, about 1 or more, and preferably in a range from 1 to 10.

When the disc-shaped outer vessel is used, a ratio (H/D) of a height H to an outer diameter D thereof is, for example, less than 1, and preferably is in a range from 0.3 to less than 1.

"Annular" of the annular fragile portion means "being surrounded by the fragile portion in a manner to form a desired shape, such as a circular shape, an elliptical shape, a polygon such as triangle, square, pentagon, or hexagon, or an indefinite shape. Note that, when the annular shape is a polygon, etc., the corners thereof are preferably rounded.

The fragile portion includes a groove formed in a continuous annular shape or a groove formed in a discontinuous annular shape. The fragile portion being a groove formed in a continuous annular shape means that the groove is formed as a solid line, and the fragile portion being a groove formed in a discontinuous annular shape means that the groove is formed as a broken line or a chain line.

The groove portion has a reduced thickness when compared to a thickness of a portion where the groove is not formed, and thus, when the pressure from the inside of the outer vessel reaches or becomes greater than a pressure limit based on the design, the groove portion is cleaved with priority.

The cross-sectional shape of the groove in the width direction may be a V-shape, a U-shape, a rectangular shape, etc. The width of the groove is not particularly limited as long as the groove can function as a fragile portion, and may be about 1 mm or less. When a plurality of discontinuous grooves are formed, distance between a trailing end of one groove and a leading end of the adjacent groove is appropriately set, and thus, a cleavage originating from the trailing end can reach the leading end.

In a preferred aspect (third aspect) of the gas generator according to the first aspect, the annular fragile portion is formed surrounding a predetermined region of the outer vessel and is configured to annularly cleave to cause the predetermined region at the inside of the annular fragile portion to be separated from the outer vessel, thereby forming an opening.

The outer vessel of the gas generator according to the third aspect may be a cylinder-type vessel or a disc-type vessel.

In the gas generator according to the third aspect, a surface (a planar surface, a curved surface, or a surface extending over both of a planar surface and a curved surface) of the outer vessel includes the annular fragile portion having a desired shape such as a circular shape or an elliptical shape.

A size of the predetermined region surrounded by the annular fragile portion is preferably determined by taking into account a pressure limit based on the design for the outer vessel, a period of time necessary to release gas until the pressure reduces at the time of actuation (a time in the order of milliseconds), etc. For example, when A is a total area of the outer vessel to which the internal pressure is applied at the time of actuation, the predetermined region can be set to be 0.01 A or greater, and for example, in a range from 0.1 A to 0.3 A.

When an abnormal operating state is established at the time of actuation, the predetermined region (a circular region, an elliptical region, etc.) surrounded by the annular fragile portion is separated, thereby forming an opening. As a result, the combustion gas is released from the opening and the pressure is reduced.

In another preferred aspect (fourth aspect) of the gas generator according to the first aspect, the annular fragile portion is circumferentially formed along a peripheral wall of the outer vessel and is configured to annularly cleave to cause the outer vessel to be separated at the cleavage, thereby forming an opening.

The outer vessel of the gas generator according to the fourth aspect may be a cylinder-type vessel or a disc-type vessel.

The gas generator according to the fourth aspect is a gas generator in which the annular fragile portion is formed along the peripheral wall of the outer vessel. In appearance, the outer vessel is axially separated, at the annular fragile portion, into two portions.

When an abnormal operating state is established at the time of actuation, the outer vessel is separated at the annular cleavage, thereby forming an opening. As a result, the combustion gas is released from the opening and the pressure is reduced.

When A is a total area of the outer vessel to which the internal pressure is applied at the time of actuation, the area of the opening formed by dividing the outer vessel can be set to be 0.01 A or greater, and for example, in a range from 0.1 A to 0.3 A.

In another preferred aspect (fifth aspect) of the gas generator according to the first aspect, the outer vessel includes a housing provided with an opening, and a closing member configured to close the opening of the housing, the closing member is fixed by bending inward, at a peripheral edge of the closing member, a peripheral wall on a side of the opening of the housing, and an annular fragile portion is formed on the inside of the bent portion of the peripheral wall, a protruding portion is formed continuously or discontinuously on an outer surface side of the closing member, and the protruding portion is in contact with the annular fragile portion.

The outer vessel of the gas generator according to the fifth aspect may be a cylinder-type vessel or a disc-type vessel.

The gas generator according to the fifth aspect is an embodiment in which the annular fragile portion is formed on the inside of the outer vessel.

Although the annular fragile portion is formed on the inside of the bent portion of the peripheral wall that fixes the closing member, pressure at the time of actuation is not applied directly to the annular fragile portion, because the closing member is located between the annular fragile portion and the interior of the outer vessel. The bent portion is an annularly bent peripheral wall of the housing on the side of the opening.

A protruding portion is formed continuously or discontinuously on the outer surface side of the closing member. The cross-sectional shape of the protrusion is not particularly limited, and may be triangular, square, trapezoidal, etc.

When an abnormal operating state is established at the time of actuation and an excessive pressure is applied to the closing member, the protrusion of the closing member strongly pushes the annular fragile portion of the bent portion fixing the closing member. As a result, the stress concentrates in the annular fragile portion and an annular cleavage is formed. Since the closing member is no longer fixed from the outer side, the closing member is disengaged from the outer vessel, and an opening is formed. As a result, the combustion gas is released from the opening and the pressure is reduced.

In the gas generators according to the first to fifth aspects, the annular fragile portion is preferably formed in a region that does not directly face a space in which the gas generating agent is accommodated.

The gas generators according to the aspects described above are preferable because the annular fragile portion is formed in a region that does not directly face a space in which the gas generating agent is accommodated, whereby, it is possible to keep the unburned gas generating agent held in the outer vessel.

The outer vessel of the gas generator according to the second aspect may be a cylinder-type vessel or a disc-type vessel.

The gas generator according to the invention of the second aspect differs in the configuration of the annular fragile portion from the gas generators according to the first to fifth aspects. However, also in the gas generator according to the second aspect, an opening is formed to release combustion gas when an abnormal operating state is established, hence the same effect can be achieved.

In the gas generator according to the fifth aspect described above, the closing member is fixed by the peripheral wall of the housing on the side of the opening, with the peripheral wall being annularly bent as it is. On the other hand, in the gas generator according to the second aspect, a plurality of split peripheral walls on the side of the opening of the housing are bent inward to fix the closing member. In the gas generator according to the fifth aspect, the groove formed on the inside of the bent portion functions as the annular fragile portion. On the other hand, in the gas generator according to the second aspect, the plurality of bent portions annularly arranged in the circumferential direction themselves function as fragile portions.

When an abnormal operating state is established at the time of actuation and an excessive pressure is applied to the closing member, the plurality of bent portions are strongly pushed outward by the closing member. This is because the bent portions are independent of each other, and therefore, when one of the bent portions is deformed outward, the adjacent bent portion hardly exhibits a function of suppressing that deformation. Accordingly, the bent portions are more easily deformed outward as compared to when a continuous annular bent portion is formed, and thus the bent portions easily function as fragile portions. Once the plurality of bent portions are pushed and spread outward, the bent portions substantially return to the state before being bent. As a result, since the closing member is no longer fixed from the outer side, the closing member is disengaged from the outer vessel and an opening is formed. Thus, the combustion gas is released from the opening and the pressure is reduced.

In a gas generator according to an embodiment of the present invention, the annular fragile portion is configured to cleave by a pressure higher than an internal pressure in the outer vessel at a time of normal operation of the gas generator, thereby forming an opening in the outer vessel.

As described above, the annular fragile portion can function as a safety arrangement by being cleaved by a pressure higher than the internal pressure in the outer vessel when the gas generator normally operates.

In an airbag module according to an embodiment of the present invention, the gas generator according to any one of the embodiments described above and an airbag are accommodated in a module case.

In a configuration in which the opening is provided facing the direction where the airbag is provided in a case where an abnormal operating state is established at the time of actuation of the gas generator and thus an opening is formed in the outer vessel to release the combustion gas, the release of the combustion gas may be obstructed and restricted by the airbag. As a result, the pressure release function may not be sufficiently exhibited. However, when the opening is provided facing a direction different from a direction where the airbag is provided, the release of the combustion gas from the opening is not restricted.

The gas generator according to the present invention includes the annular fragile portion that functions as a safety arrangement for reducing pressure inside the outer vessel even when gas is not smoothly discharged for some reason at the time of actuation and, as a result, an abnormal operating state is established. Thus, the gas generator according the present invention can improve product safety.

The gas generator according to the present invention can be used as a gas generator used in an airbag device mounted in an automobile.

1. Gas Generator in FIG. 1A and FIG. 1B.

Figure 1B:
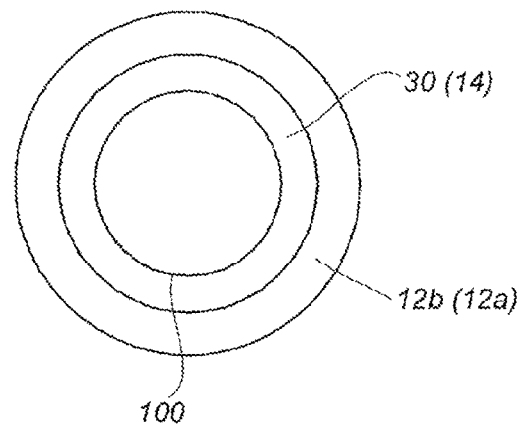
FIG. 1B is a plan view, from the axial direction, of the gas generator according to the embodiment of the present invention.

A gas generator shown in FIG. 1A is the same as a gas generator 10 shown in FIG. 1 of JP 2009-119893 A except that an annular fragile portion 100 is formed as shown in FIG. 1B.

The outer vessel of the gas generator 10 shown in FIG. 1A and FIG. 1B includes a cylindrical housing 12, of which both ends are open, a closing member 14 configured to close an opening at one end (an end on a crimped portion 12a side) of the cylindrical housing 12, and a boss 30 configured to close an opening at the other end (an end on a crimped portion 12*b* side) of the cylindrical housing 12, with the boss 30 being provided with an igniter 31 attached thereto.

A ratio (L/D) of a length L to an outer diameter D of the cylindrical housing 12 can be in a range from 1 to 10.

As shown in FIG. 1B, the gas generator 10 shown in FIG. 1A and FIG. 1B includes an annular fragile portion 100 formed in one or both of the closing member 14 and the boss 30. No member that connects and fixes the closing member 14 to the boss 30 is provided. When the annular fragile portion 100 is formed in the boss 30, the annular fragile portion 100 is formed to surround the igniter 31 (however, the igniter 31 is not shown in FIG. 1B). At whichever side, the boss 30 side or the closing member 14 side, the fragile portion 100 is formed coaxially with the axis of the housing 12.

The annular fragile portion 100 is formed on the outer surface of the closing member 14 and the outer surface of the boss 30, and is formed in a portion thereof that does not face a first gas generating agent chamber 60 accommodating a first gas generating agent 61 and a second gas generating agent chamber 70 accommodating a second gas generating agent 71. When A is a total area of the outer vessel to which an internal pressure is applied at the time of actuation, an area on the inside of the annular fragile portion 100 is about 0.03 A. In FIG. 1B, the annular fragile portion 100 is circular.

The annular fragile portion 100 is a thinned portion, which is a groove having a U-shaped cross-section in a width direction thereof. The width and the depth of the groove are not particularly limited, and the groove width is preferably 1 mm or less, and the groove depth is preferably from 30% to 60% of the thickness of the closing member 14 or the boss 30.

Note that the annular fragile portion 100 indicates where a fragile portion is formed and does not indicate how a fragile portion is configured. The annular fragile portion 100 can be a solid line groove, a broken line groove, or a chain line groove.

When the annular fragile portion 100 is formed in the closing member 14, the annular fragile portion 100 is formed to surround a region (a region on the inside of the two arrows) of the closing member 14 at the inside of the crimped portion 12*a* and at the inside of a portion of the closing member 14 contacting with a first end surface 20*a* of a cylindrical filter 20.

When the annular fragile portion 100 is formed in the boss 30, the annular fragile portion 100 is formed on the inside of the crimped portion 12*b* in a manner to surround the igniter 31 (a region on the inside of the two arrows).

Operation of the gas generator 10 shown in FIG. 1A and FIG. 1B will be described.

When the gas generator 10 shown in FIG. 1A and FIG. 1B is actuated, the first gas generating agent 61 in the first gas generating agent chamber 60 and the second gas generating agent 71 in the second gas generating agent chamber 70 are ignited and burned, whereby combustion gas is generated.

When a situation occurs in which smooth discharge of the combustion gas is hindered, the internal pressure increases, and when the pressure from the inside of the outer vessel (the cylindrical housing 12, the closing member 14, and the boss 30) reaches or becomes greater than a pressure limit based on the design, the annular fragile portion 100 of the closing member 14 or the boss 30 is cleaved along the annular groove.

When the annular fragile portion 100 of the closing member 14 is cleaved, the circular inner region shown in FIG. 1B is separated from the closing member 14 to form an opening, and the combustion gas in the outer vessel is released, and as a result, the pressure in the outer vessel is vented.

When the annular fragile portion 100 of the boss 30 is cleaved, the circular inner region shown in FIG. 1B, which includes the igniter 31, is separated from the boss 30 to form an opening, and the combustion gas in the outer vessel is released, and as a result, the pressure in the outer vessel is vented.

When the gas generator 10 shown in FIG. 1A and FIG. 1B operates normally, the annular fragile portion 100 does not cleave, and the combustion gas is discharged from a plurality of gas discharge ports 16 formed in the cylindrical housing 12, whereby the airbag is inflated. The airbag before inflation is disposed in a direction perpendicular to a direction of an axis X of the cylindrical housing 12 (e.g., in any direction in which the gas discharge port 16 is formed). Thus, even when the annular fragile portion 100 is cleaved, causing a circular hole to be formed in the closing member 14 or the boss 30, the discharge of the combustion gas is not hindered by the airbag.

2. Gas Generator in FIG. 2

Figure 2:
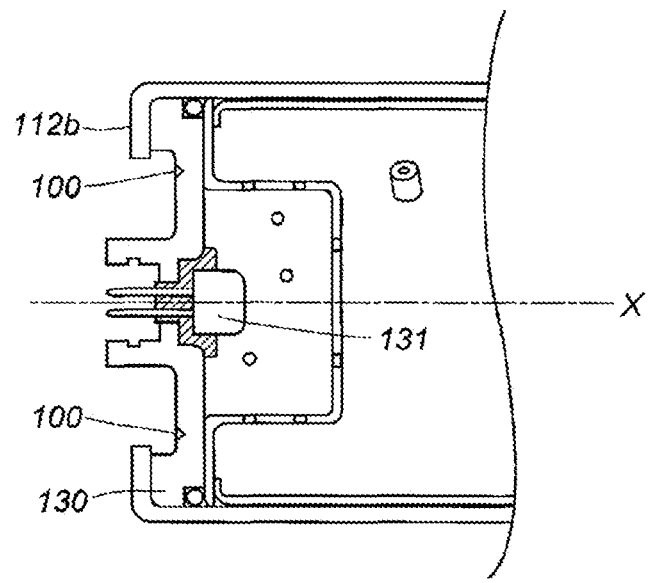
FIG. 2 is a partial cross-sectional view of one end of a gas generator according to an embodiment different from the embodiment shown in FIG. 1A and FIG. 1B.

The gas generator in FIG. 2 illustrates a portion corresponding to the boss 30 side of the gas generator 10 in FIG. 1A and FIG. 1B.

In a boss 130, the annular fragile portion (a circular fragile portion) 100 is formed at the inside of a crimped portion 112*b* in a manner to surround an igniter 131.

When the annular fragile portion 100 of the boss 130 is cleaved, the inner region of the fragile portion 100 including a portion, where the igniter 131 is located, is separated from the boss 130 to form an opening, whereby the combustion gas in the outer vessel is released, and as a result, the pressure in the outer vessel is reduced.

3. Gas Generator Shown in FIG. 3

Figure 3:
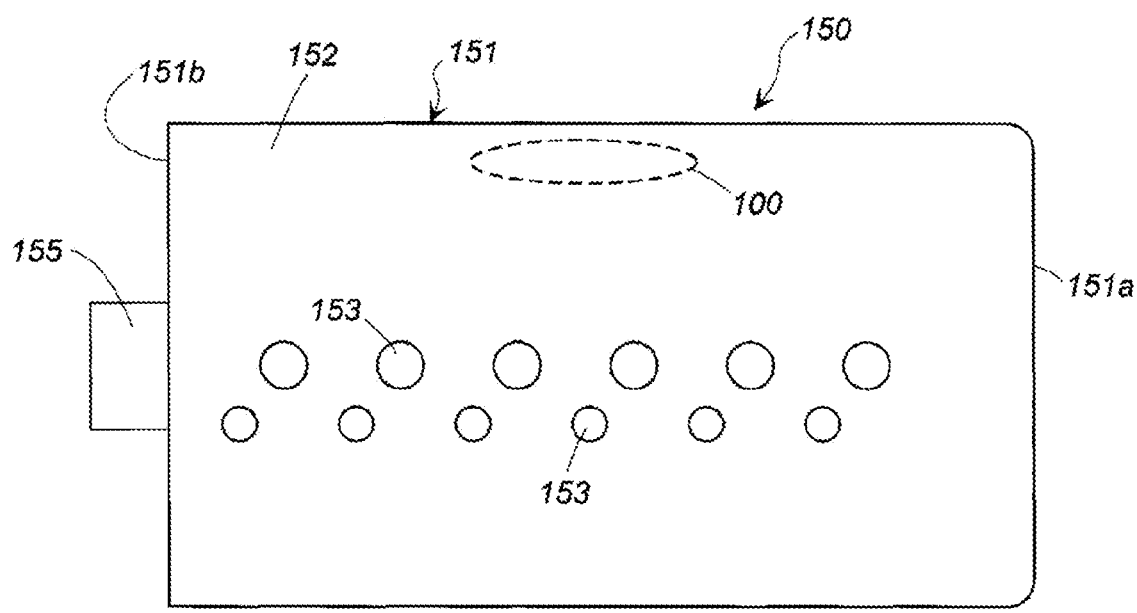
FIG. 3 is a side view of a gas generator according to an embodiment different from the embodiment shown in FIG. 1A and FIG. 1B.

A gas generator 150 shown in FIG. 3 includes a cylindrical housing 151 that is closed on one end surface 151*a* side thereof, and an igniter 155 attached to an opening on the other end surface 151*b* side of the rest thereof to close the opening. The igniter 155 is attached in the same manner as in FIG. 1A and FIG. 2, for example.

The ratio (L/D) of the length L to the outer diameter D of the cylindrical housing 151 can be in a range from 1 to 10.

A gas generating agent is accommodated in the cylindrical housing 151, which includes a plurality of gas discharge ports 153 having different diameters and closed by a metal sealing tape from the inside.

In the gas generator 150 shown in FIG. 3, the annular fragile portion (a circular fragile portion) 100 is formed on a peripheral wall surface 152 of the cylindrical housing 151. When A is a total area of the outer vessel to which an internal pressure is applied at the time of actuation, an area on the inside of the annular fragile portion 100 is about 0.03 A.

Note that the annular fragile portion 100 indicates where the fragile portion is formed and does not indicate how the annular fragile portion 100 is configured. The annular fragile portion 100 can be a solid line groove, a broken line groove, or a chain line groove.

When viewed from the one end surface 151*a* side in relation to the central axis extending in the longitudinal axis direction of the cylindrical housing 151, the direction in which the plurality of gas discharge ports 153 are opened is different by 90° from direction to a position where the annular fragile portion 100 is formed.

When the gas generator 150 is actuated and the gas generating agent is ignited and burned, and as a result combustion gas is generated, and a situation occurs in which smooth discharge of the combustion gas is hindered, the pressure from the inside of the outer vessel (the cylindrical housing 151 and the closing member on the other end surface 151b side) reaches or becomes greater than a pressure limit based on the design. As a result, the annular fragile portion 100 formed on the peripheral wall surface 152 of the cylindrical housing 151 is cleaved, the circular inner region is separated from the peripheral wall surface 152 of the cylindrical housing 151 thereby forming an opening, and the combustion gas in the outer vessel is released, and as a result, the pressure in the outer vessel is vented.

When the gas generator 150 shown in FIG. 3 operates normally, the annular fragile portion 100 does not cleave, and the combustion gas is discharged from a plurality of gas discharge ports 153 formed in the cylindrical housing 151, whereby the airbag is inflated. The airbag before inflation is disposed in a direction perpendicular to an axial direction of the cylindrical housing 151 (e.g., in a direction in which the gas discharge ports 153 are formed). Thus, even when a circular opening is formed in the peripheral wall surface 152, the discharge of the combustion gas is not hindered by the airbag.

4. Gas Generator Shown in FIG. 4

Figure 4:
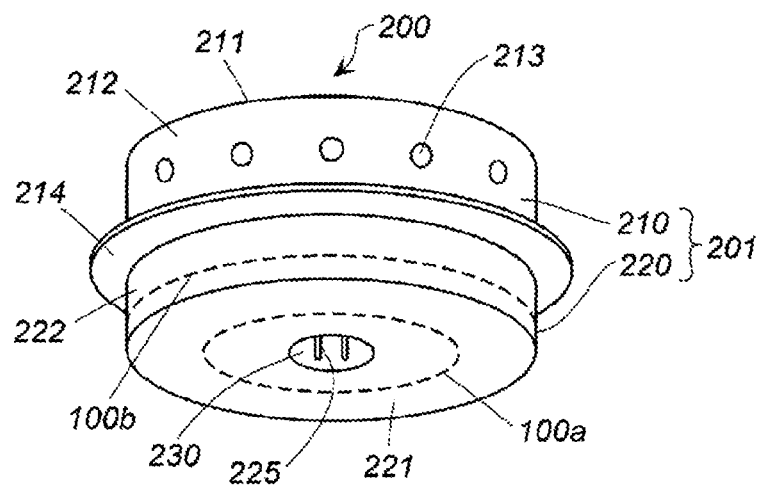
FIG. 4 is a perspective view of a gas generator according to an embodiment different from the embodiment shown in FIG. 1A and FIG. 1B.

A gas generator 200 shown in FIG. 4 includes the outer vessel including a housing 201 formed by a combination of a diffuser shell 210 and a closure shell 220.

The diffuser shell 210 includes a top plate 211, an upper peripheral wall 212, and a flange 214. A plurality of gas discharge ports 213 are formed in the upper peripheral wall 212 at circumferentially even intervals.

The closure shell 220 includes a bottom plate 221 and a lower peripheral wall 222.

An igniter 225 and a gas generating agent are accommodated in the housing 201. The bottom plate 221 includes, at the center thereof, an opening that is a connector insertion port 230 for the igniter 225.

The ratio (H/D) of the height (height from the bottom plate 221 to the top plate 211) H of the housing 201 to the outer diameter (outer diameter of the upper peripheral wall 212 and the lower peripheral wall 222) D of the housing 201 can be in a range from 0.3 to less than 1.

The gas generator 200 shown in FIG. 4 may be formed including an annular fragile portion in either the bottom plate 221 or the lower peripheral wall 222.

When the annular fragile portion is formed in the bottom plate 221, a circular fragile portion 100a surrounding the igniter 225 may be formed. When A is a total area of the outer vessel to which an internal pressure is applied at the time of actuation, an area on the inside of the annular fragile portion 100a is about 0.03 A. Note that the flange 214 is not included in the total area A, because no internal pressure is applied to the flange 214 at the time of actuation.

When the annular fragile portion is formed in the lower peripheral wall 222, a fragile portion 100b may be formed along the peripheral surface of the lower peripheral wall 222 to extend along the entire circumference of the lower peripheral wall 222. When A is a total area of the outer vessel to which an internal pressure is applied at the time of actuation, an area of the opening resulting from the cleaving of the annular fragile portion 100b is about 0.4 A. Both of the fragile portions 100a and 100b are formed to surround the igniter 225. Furthermore, both of the fragile portions 100a and 100b are formed coaxially with the axis of the housing 201.

Note that the fragile portions 100a and 100b indicate where fragile portions are formed and do not indicate how fragile portions are configured. The annular fragile portions 100a and 100b can be solid line grooves, broken line grooves, or chain line grooves. In addition, to obtain a predetermined opening area when the fragile portions 100a and 100b are cleaved, the top plate 211 is not connected with and not fixed to the bottom plate 221 by using, for example, a central cylindrical member 16 designated by 16 in FIG. 1 of JP H11-20598 A.

Operation of the gas generator 200 shown in FIG. 4 will be described.

When the gas generator 200 shown in FIG. 4 is actuated and the gas generating agent in the gas generator 200 is ignited and burned, and as a result combustion gas is generated, and a situation occurs in which smooth discharge of the combustion gas is hindered, the pressure from the inside of the housing 201 reaches or becomes greater than a pressure limit based on the design, and the annular fragile portion 100a of the bottom plate 221 or the annular fragile portion 100b of the lower peripheral wall 222 is cleaved.

When the annular fragile portion 100a of the bottom plate 221 is cleaved, the circular inner region is separated from the bottom plate 221 thereby forming an opening, and the combustion gas in the housing 201 is released, and as a result, the pressure in the housing 201 is vented.

When the annular fragile portion 100b of the lower peripheral wall 222 is cleaved, the bottom plate 221 is separated from the fragile portion 100b, whereby an opening is formed, and the combustion gas in the housing 201 is released, and as a result, the pressure in the housing 201 is vented.

When the gas generator 200 shown in FIG. 4 operates normally, the fragile portion 100a or 100b does not cleave, and the combustion gas is discharged from a plurality of gas discharge ports 213 formed in the upper peripheral wall 212, and the airbag is inflated. The airbag before inflation is disposed in an axial direction of the housing 201 (e.g., on the top plate 211 side). Thus, even when the fragile portion 100a or the fragile portion 100b is cleaved thereby forming an opening, the discharge of the combustion gas is not hindered by the airbag.

5. Gas Generator in FIG. 5

Figure 5:
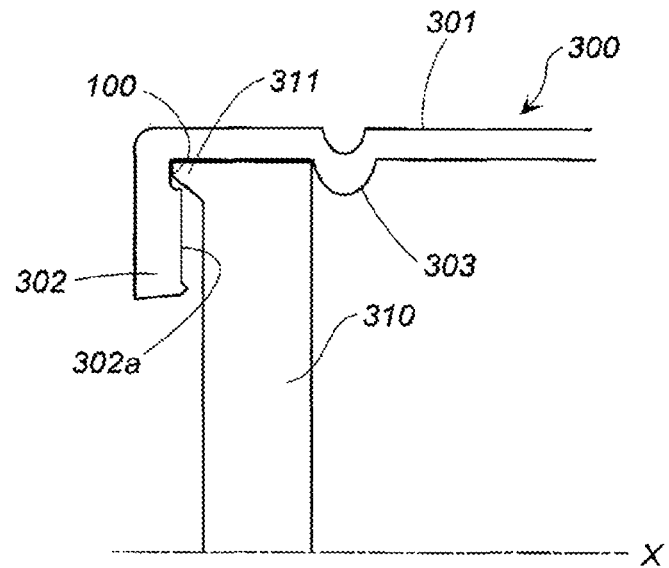
FIG. 5 is a partial cross-sectional view of one end of a gas generator according to an embodiment different from the embodiment shown in FIG. 1A and FIG. 1B.

A gas generator 300 shown in FIG. 5 corresponds to the closing member 14 side of the gas generator 10 shown in FIG. 1A and FIG. 1B.

An opening at one end of a cylindrical housing 301 is closed by a closing member 310.

The closing member 310 includes, in the peripheral edge thereof, a plurality of protruding portions 311 formed at circumferentially even intervals.

The closing member 310 is fixed by being supported, from outside, by an annular bent portion 302 formed by bending the cylindrical housing 301 inward at an opening at one end of the cylindrical housing 301, and supported, from inside, by a protrusion 303, which protrudes inward, of the cylindrical housing 301.

The annular bent portion 302 includes an annular fragile portion 100 at a corner of the inner surface 302a, and the plurality of protruding portions 311 of the closing member 310 are in contact with the annular fragile portion 100.

Operation of the gas generator 300 shown in FIG. 5 will be described.

When the gas generator 300 shown in FIG. 5 is actuated and the gas generating agent in the gas generator 300 is ignited and burned, and as a result combustion gas is generated, and a situation occurs in which smooth discharge of the combustion gas is hindered, the pressure from the inside of the cylindrical housing 301 reaches or becomes greater than a pressure limit based on the design, the plurality of protruding portions 311 of the closing member 310 outwardly applies a force to the annular fragile portion 100 thereby breaking the annular fragile portion 100.

The closing member 310 is no longer supported from outside after the annular bent portion 302 is cut off, and thus the closing member 310 is disengaged thereby forming an opening. As a result, the combustion gas inside the cylindrical housing 301 is released, and thus the pressure inside the cylindrical housing 301 is vented.

6. Gas Generator in FIG. 6

Figure 6:
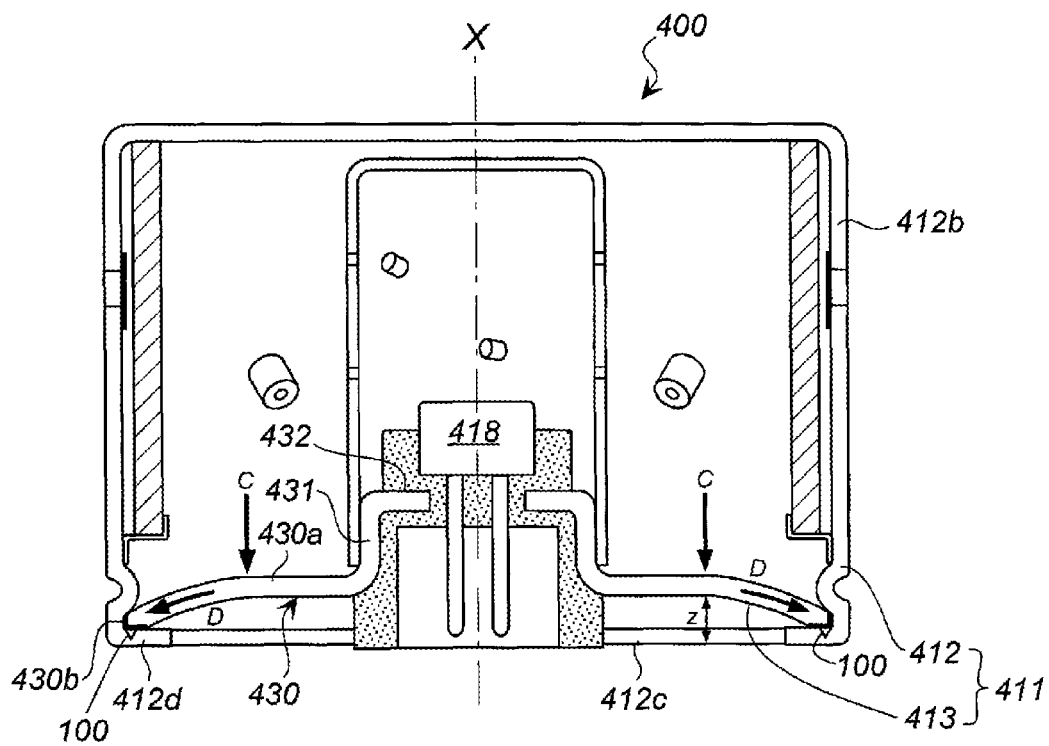
FIG. 6 is an axial cross-sectional view of a gas generator according to an embodiment different from the embodiment shown in FIG. 1A and FIG. 1B.

A gas generator in FIG. 6 is the same as a gas generator 10 shown in FIG. 1 of JP 2013-224088 A except for having the annular fragile portion 100, but, is numbered differently in order to avoid using the same numerals as those in the gas generator 10 shown in FIG. 1A and FIG. 1B.

A gas generator 400 shown in FIG. 6 includes an outer vessel including a housing 411 formed by a combination of a diffuser shell 412 and a closure shell 413.

The diffuser shell 412 includes an annular bent portion 412d formed by bending an end of an opening 412c side of a peripheral wall 412b inward.

The closure shell 413 is substantially annular and includes a cylindrical wall 431 vertically extending from the inner peripheral edge of an outer annular plate portion 430, and an inner annular planar portion 432 extending inward from an opening peripheral edge of the cylindrical wall 431. The outer annular plate portion 430 forms, as a whole, an annular curved portion 430a that is curved toward the inside of a housing 411.

An outer peripheral portion 430b of the outer annular plate portion 430 and the annular bent portion 412d correspond to the protruding portions 311 of the closing member 310 and the annular bent portion 302 shown in FIG. 5. The annular fragile portion 100 is formed on the inside of the annular bent portion 412d. The outer peripheral portion 430b of the outer annular plate portion 430 includes a protrusion (not shown) arranged in the circumferential direction, and the protrusion is in contact with the annular fragile portion 100 of the annular bent portion 412d.

At the time of actuation, when the pressure from the inside of the housing 411 reaches or becomes greater than a pressure limit based on the design, the annular fragile portion 100 is cleaved. As a result, the annular bent portion 412d is separated, the closure shell 413 is disengaged together with an igniter 418, and an opening is formed, whereby, the combustion gas in the housing 411 is released, and as a result, the pressure in the housing 411 is reduced.

7. Gas Generator in FIG. 7

Figure 7:
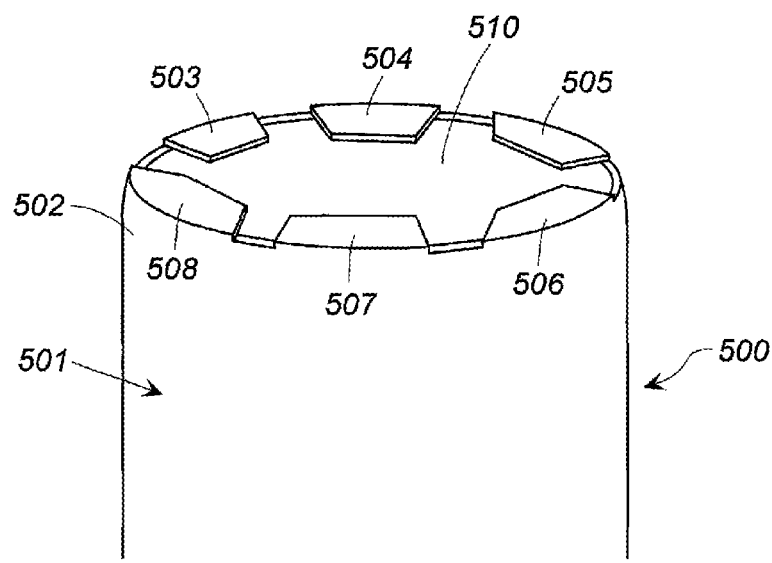
FIG. 7 is a perspective view of one end of a gas generator according to an embodiment different from the embodiment shown in FIG. 1A and FIG. 1B.

A gas generator 500 shown in FIG. 7 is another example of a portion corresponding to the closing member 14 side of the gas generator 10 shown in FIG. 1A and FIG. 1B.

An opening at one end of a cylindrical housing 501 is closed by a closing member 510. The closing member 510 is supported, from inside, by the same protrusion as the protrusion 303 shown in FIG. 5, and, from outside, by six bent portions 503 to 508 which are formed by inwardly bending the opening side end of a peripheral wall 502.

Before the six bent portions 503 to 508 are formed, the cylindrical housing 501 includes six split peripheral walls formed, at an opening at one end of the peripheral wall 502, at circumferentially even intervals. The six split peripheral walls are bent to form the annularly arranged six bent portions 503 to 508.

When the closing member is supported by bending the six bent portions 503 to 508, as described above, rather than annularly bending the entire opening of the cylindrical housing, similarly to the crimped portions 12a and 12b shown in FIG. 1A and FIG. 1B, a decrease in support strength can be achieved, and thus the six bent portions 503 to 508 function as an annular fragile portion.

At the time of actuation, when the pressure from the inside of the cylindrical housing 501 reaches or becomes greater than a pressure limit based on the design, the six bent portions 503 to 508 receives pressure applied axially outward by the closing member 510. As a result, the six bent portions 503 to 508 are deformed by being pressed outward.

Once the six bent portions 503 to 508 are pressed outward, the closing member 510 is no longer supported from outside, and thus the closing member 510 is disengaged thereby forming an opening. As a result, the combustion gas inside the cylindrical housing 501 is released, and thus the pressure inside the cylindrical housing 501 is reduced.

The present invention was described as above. Of course, the present invention includes variations in various forms within the scope thereof, and these variations are not to be regarded as departure from the scope of the invention. Also, all modifications that will be clearly deemed as variation of the present invention by one skilled in the art are included within the scope of the following claims.

The invention claimed is:

1. A gas generator comprising:
an outer vessel including a housing provided with a gas discharge port, the outer vessel accommodating therein an igniter and a gas generating agent;
an igniter attached to the outer vessel;
a dividing member accommodated inside the outer vessel, the dividing member and an inner peripheral surface of the outer vessel where the igniter is attached defining an igniter chamber accommodating the igniter, and defining a combustion chamber, outside the igniter chamber, accommodating the gas generating agent, the dividing member defining an aperture prior to and after activation of the gas generator, the aperture configured to allow the igniter chamber in fluid communication with the combustion chamber, wherein
a surface of the outer vessel surrounding the igniter includes an annular fragile portion, and
the annular fragile portion is one of a continuous and discontinuous circular groove, and the outer vessel is configured to cleave along the groove to form an opening that relieves a pressure inside the outer vessel through the igniter chamber when the pressure abnormally increases.

2. The gas generator according to claim 1, wherein the annular fragile portion is configured to annularly cleave to cause a portion of the outer vessel surrounding the igniter to be separated from the outer vessel, thereby forming the opening.

3. The gas generator according to claim 1, wherein the annular fragile portion is circumferentially formed along a peripheral wall of the outer vessel, and is configured to annularly cleave to cause the outer vessel to be divided at a cleavage, thereby forming an opening.

4. The gas generator according to claim 1, wherein the outer vessel includes a housing provided with an opening, and a closing member configured to close the opening of the housing,
the closing member is fixed by bending inward, at a peripheral edge of the closing member, a peripheral wall on a side of the opening of the housing, and
the annular fragile portion is formed on the inside of the bent portion of the peripheral wall, a protruding portion is formed continuously or discontinuously on an outer surface side of the closing member, and the protruding portion is in contact with the annular fragile portion.

5. The gas generator according to claim 1, wherein the annular fragile portion is formed in a region that does not directly face the combustion chamber.

6. The gas generator according to claim 1, wherein the annular fragile portion is configured to cleave when the pressure increases above an internal pressure at a time of a normal operation of the gas generator.

7. An airbag module, comprising:
an airbag configured to be in an inflated state from a folded state by being supplied with gas;
a module case configured to accommodate the airbag; and
the gas generator according to claim 1 configured to supply the gas to the airbag, wherein
the gas generator is disposed in the module case, with the annular fragile portion facing a direction different from a direction where the airbag is provided.

8. The gas generator according to claim 1, wherein
the outer vessel includes a cylindrical housing having an open end and a closing member that closes the open end and accommodates the igniter,
the igniter is attached to the closing member, and
the annular fragile portion is formed in the closing member surrounding the igniter.

9. The gas generator according to claim 1, wherein
the outer vessel includes a cylindrical housing having an open end and a closing member that closes the open end and accommodates the igniter,
the groove is formed in the closing member, and
the closing member is configured to cleave along the groove to form an opening, having a diameter smaller than an inner diameter of the outer vessel, that relieves a pressure inside the outer vessel when the pressure abnormally increases.

* * * * *